United States Patent [19]
Edlinger et al.

[11] Patent Number: 6,036,768
[45] Date of Patent: Mar. 14, 2000

[54] CEMENT COMPOSITION

[75] Inventors: Alfred Edlinger, Baden; Juraj Gebauer, Veltheim; Horst Wolter, Möriken, all of Switzerland

[73] Assignee: "Holderbank" Financiere Glarus AG, Glarus, Switzerland

[21] Appl. No.: 09/117,582

[22] PCT Filed: Nov. 21, 1997

[86] PCT No.: PCT/AT97/00256

§ 371 Date: Jul. 29, 1998

§ 102(e) Date: Jul. 29, 1998

[87] PCT Pub. No.: WO98/23550

PCT Pub. Date: Jun. 4, 1998

[30] Foreign Application Priority Data

Nov. 29, 1996 [AT] Austria ..................................... 2082/96

[51] Int. Cl.[7] ............................. C04B 7/13; C04B 28/02
[52] U.S. Cl. ...................... 106/714; 106/708; 106/709; 106/724; 106/725; 106/731; 106/790; 106/819; 106/DIG. 1
[58] Field of Search .................... 106/714, 724, 106/725, 731, 790, 819, 708, 709, DIG. 1

[56] References Cited

U.S. PATENT DOCUMENTS 5,453,123   9/1995   Burge et al. ............................ 106/724

FOREIGN PATENT DOCUMENTS

| 611 081 | 8/1994 | European Pat. Off. . |
|---|---|---|
| 2714316 | 6/1995 | France . |
| 3105054 | 2/1982 | Germany . |
| 3412357 | 10/1985 | Germany . |
| 3437680 | 4/1986 | Germany . |
| 2 051 031 | 1/1981 | United Kingdom . |

OTHER PUBLICATIONS

Chemical Abstract No. 107:182259, abstract of European Patent Specification No. 220073, Apr. 1987.

Database WPI Week 9528 Derwent Publications Ltd., London, GB; AN 95–211839 abstract of Japanese Patent Specification No. 07–124535 (May 1995).

Chemical Abstract, vol. 90, No. 26, Jun. 25, 1979 columbus, Ohio, US; Abstract No. 209008m, abstract of USSR Patent No. 654567 (Mar. 1979).

Chemical Abstract, vol. 112, No. 16, Apr. 16, 1990, Columbus, Ohio,US; Abstract No. 144693g, abstract of Polish Patent Specification No. 143,446 (Dec. 1983).

*Primary Examiner*—Anthony Green
*Attorney, Agent, or Firm*—Pillsbury Madison & Sutro, LLP

[57] ABSTRACT

The cement composition of this invention includes 10 to 35% by weight of portland cement, 65 to 90% by weight of a synthetic pozzolan, and an activator for reducing the positive surface potential of the synthetic pozzolan. The synthetic pozzolan is obtained by an at least partial reduction from combustion residues having a $SiO_2/CaO$ ratio of greater than 1:1 and containing $Na_2O$ and $K_2O$ as alkali oxides in an amount exceeding 1.5% by weight. The activator includes anionically active or anionic tensides.

33 Claims, 2 Drawing Sheets

CEMENT COMPOSITION

This application is the national phase of international application PCT/AT97/00256, filed Nov. 21, 1997 which designated the U.S.

BACKGROUND OF THE INVENTION

1. Field of the Invention

The invention relates to a cement composition comprising
a) 10 to 35% by weight of cement, in particular portland cement
b) 65 to 90% by weight of a synthetic pozzolan obtained by an at least partial reduction from combustion residues having an $SiO_2/CaO$ ratio of >1, such as e.g. waste incineration slags, and containing alkali oxides ($Na_2O$ and $K_2O$) in amounts exceeding 1.5% by weight,
c) an activator for reducing the positive surface potential of the synthetic pozzolan, such as e.g. anionically active or anionic tensides, in particular, sulfonates.

2. Prior Art

Cement compositions containing cement and, in particular, portland cement and additionally more or less large portions of extenders or fillers are known. Also has already been proposed to employ cement along with natural pozzolans or synthetic pozzolans as well as carbonates as extenders, the majority of such extenders or fillers being limited merely in view of the desired strength values. With some such mixtures, demixing by sedimentation may occur, this applying, in particular, to fly ash, sand or blast furnace slag. The risk of demixing by sedimentation is faced, in particular, with low surface charges, wherein pozzolans, fly ash, microsilica and blast furnace slag, as a rule, have low to clearly negative surface charges. Pozzolans having clearly negative surface charges stand out for their good miscibility with cement, in particular, in the alkaline range. The same holds for micro-silica powders exhibiting extremely negative surface charges. Investigations have demonstrated that the respectively measured negative surface charge quite definitely is a function of the pH, wherein low surface charges remaining nearly constant over the total pH range were measured for fly ash and blast furnace slag.

Mixtures to be used for the production of coarse- and/or fine-grain-flux-containing concrete comprising 70 to 35% by weight of cement and 30 to 65% by weight of latent hydraulic substances as well as 0.05 to 1% by weight of a dispersant such as, for instance, lignin sulfonate have become known from DE-A1 31 05 054. In DE-A1 31 05 054, decreasing strength values were measured with increasing amounts of synthetic pozzolans.

Synthetic pozzolans and, in particular, those obtained by an at least partial reduction from combustion residues having an $SiO_2/CaO$ ratio of >1, such as e.g. waste incineration slags, and containing alkali oxides in amounts exceeding 1.5% by weight are characterized by positive surface charges. Consequently, the admixture of such synthetic pozzolans usually has not resulted in enhanced strength properties, in particular, in terms of early strength. Due to the formation of agglomerates, mixed cement exhibits poor working properties. As expected, such cement mixtures have, therefore, strongly fallen short of the early strength values measured for portland cement or cement compositions containing other extenders or fillers.

SUMMARY OF THE INVENTION

Surprisingly, it has now been found that cement composition comprising a) 10 to 35% by weight of cement, in particular portland cement
b) 65 to 90% by weight of a synthetic pozzolan obtained by an at least partial reduction from combustion residues having an $SiO_2/CaO$ ratio of >1, such as e.g. waste incineration slags, and containing alkali oxides ($Na_2O$ and $K_2O$) in amounts exceeding 1.5% by weight, and
c) an activator.

The strength values of the portland cement and pozzolan may be raised to values not only equal, but even superior to those of the best known standard cement if an activator is additionally added to reduce the positive surface potential of the synthetic pozzolan, such as e.g. anionically active or anionic tensides. The high alkali oxide content as observed, in particular, in acidic slags causes surface charging by sodium and potassium ions, pozzolanic hydration requiring from the material to have a relatively high density or small particle interspace. Without any activator, the positive surface charge causes the repulsion of the particles and hence a low particle density, thereby preventing or impeding hydration and, thus, any contribution to increasing strength. Such surface charges now may be compensated for by the activators mentioned, causing the pozzolanic particles to no longer repel mutually and rendering feasible a higher density and, on the whole, an enhanced hydration. Excellent early strength values and outstanding final strength values could be obtained even at relatively high portions of such slags or synthetic pozzolans in the cement compositions.

This effect is intensified if, as proposed by the invention, the cement portion is limited to a maximum of 35% by weight. This unexpected observation is substantiated by the high $Na_2O$ and $K_2O$ contents in the acidic pozzolans containing 40 to 70% by weight of $SiO_2$. Such amounts of $Na_2O$ and $K_2O$ result in the catalysis of the pozzolanic reaction of $SiO_2$, wherein too high a CaO or cement portion causes a decrease of the earth-alkaline activity, since the dissociation of $Ca(OH)_2$ and hence the hydration of the cement are repressed by the great amount of OH ions available from the hydration of the alkali compounds of the pozzolan, thus reducing the catalytic activity as a whole.

In a particularly advantageous manner, the cement composition contains activators in amounts of from 1 to 3% by weight. Preferably, pozzolans may be contained in the cement composition provided by the invention in amounts of from 65 to 70% by weight, excellent strength properties having been surprisingly found despite such high amounts of pozzolans.

In a particularly simple manner, an activator selected from the group consisting of organic sulfonates, for instance lignin sulfonate or naphthalene sulfonate, may be added in amounts of from 1.0 to 2.0% by weight, preferably 1.5% by weight.

A particularly high final strength may be obtained if, as in accordance with a preferred further development, the pozzolan is ground to a fineness of 3000 to 6000 $cm^2/g$.

The addition of anionically active or anionic tensides, in principle, may be effected already during the preparation of the cement composition. In a particularly simple manner, it may alternatively be proceeded in that the anionically active or anionic tensides are added along with water during the production of concrete or mortar.

The effect of activators is particularly striking with synthetic pozzolans having high alkali oxide contents, wherein, preferably, such synthetic pozzolans are used, whose $Na_2O$ and $K_2O$ content is chosen to be larger than 2% by weight.

In the following, the invention will be explained in more detail by way of strength measurements and properties of the employed materials illustrated in the drawing.

DETAILED DESCRIPTION OF THE PREFERRED EMBODIMENTS OF THE INVENTION

Figure 1:
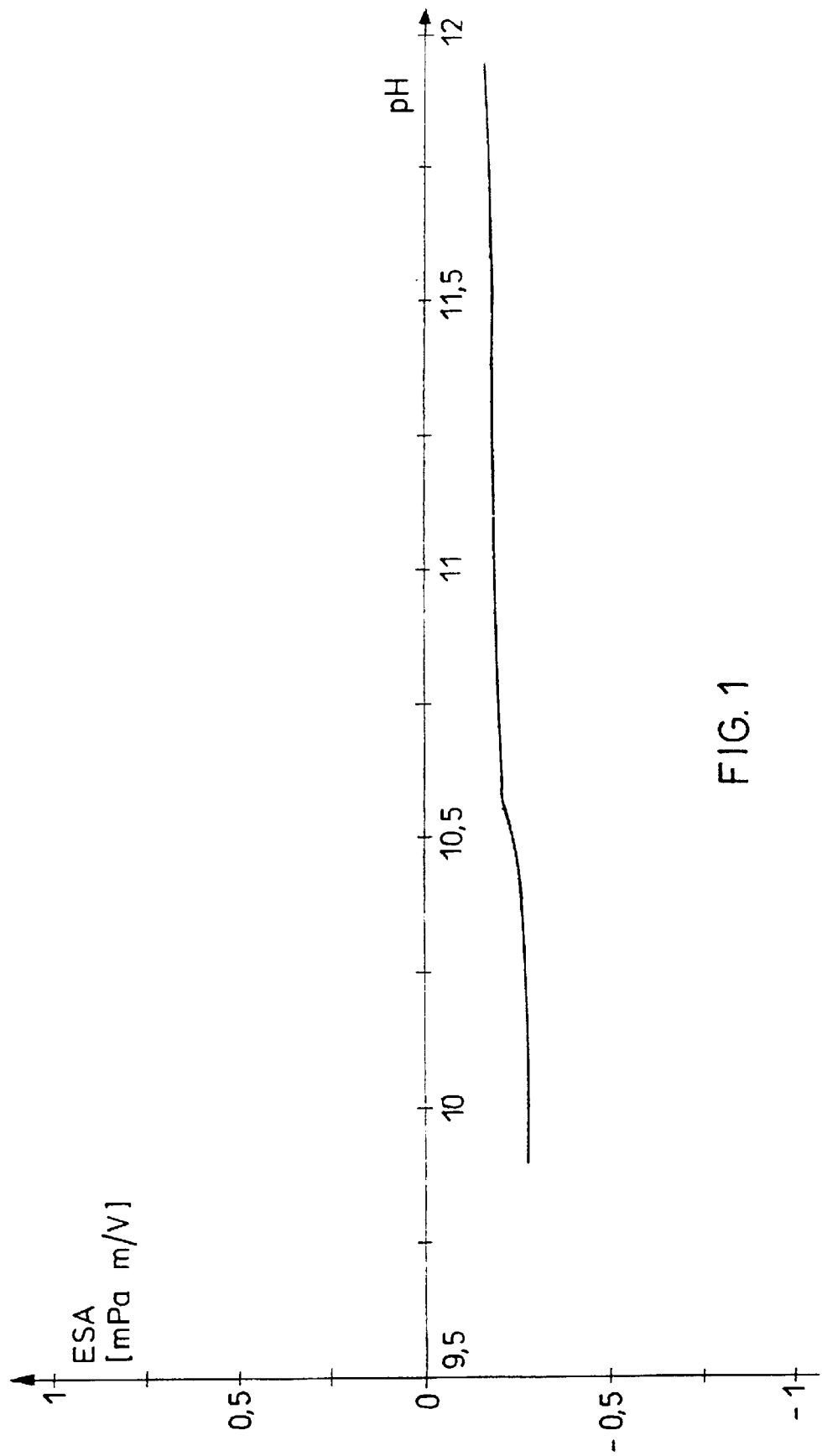
In FIG. 1, the surface charge ESA in mPa.m/V of standard portland cement is illustrated over the pH range from 10 to 11.5. From that illustration it is apparent that standard cement has a substantially constant low negative surface charge over the pH range in question.
Figure 2:
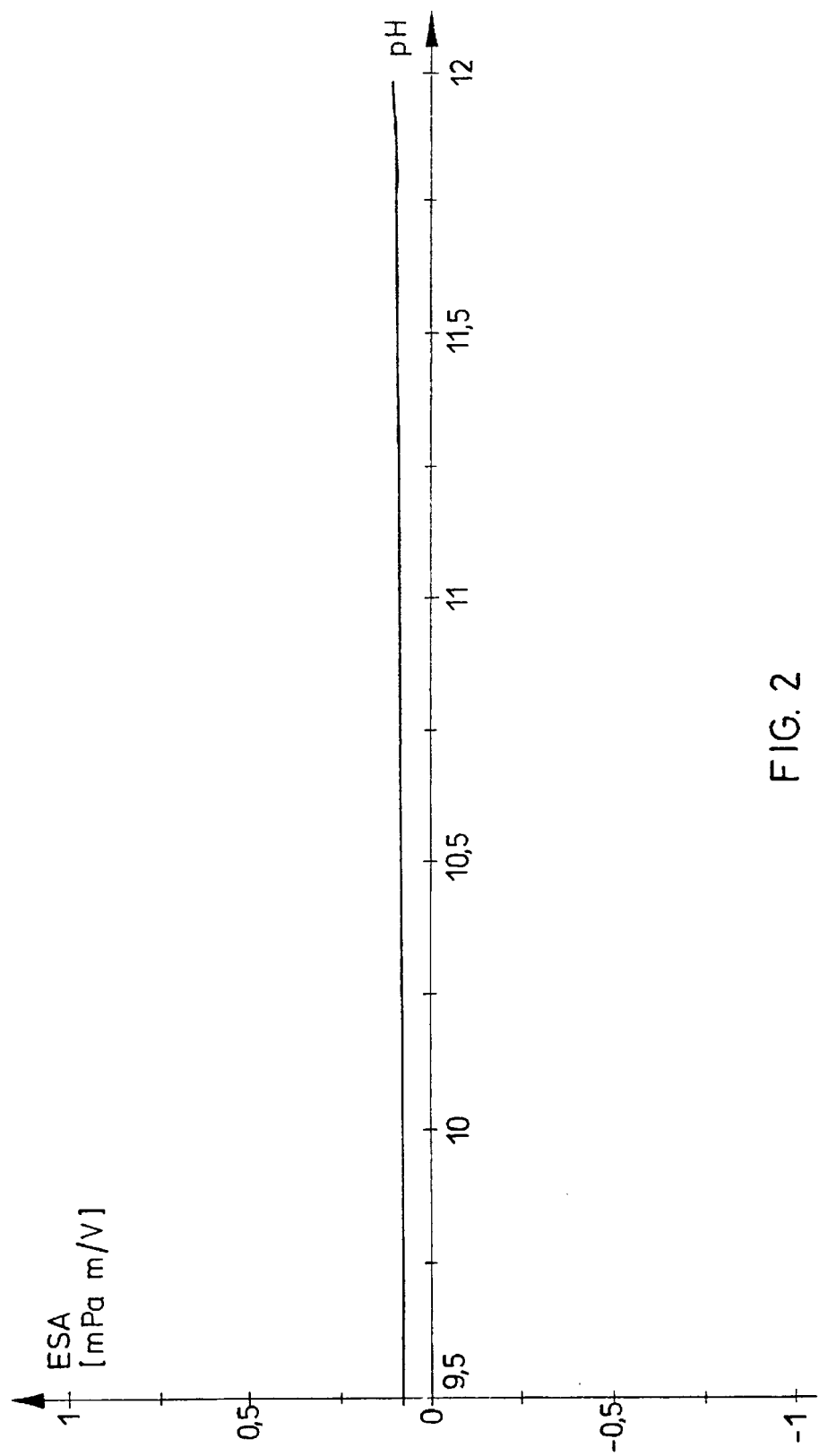
FIG. 2 depicts the surface charges of a synthetic pozzolan derived from waste incineration slags and having an $Na_2O$ and $K_2O$ content of more than 2.5% by weight, it being apparent that, over the pH range in question of 9.5 to 12, the surface charge is slightly positive and substantially constant.

In the Table below, the compressive strengths measured after one, two or twenty-eight days for a reference standard cement, two laboratory cement compositions and a cement composition according to the invention have been compared. The values indicated in column I for the reference cement are characterized by a good early strength and a good final strength.

The laboratory cement LZ1 (column II) consisted of 60% by weight of the reference cement to which 40% by weight of lime were added under grinding. The result of the extender in that case is that the final strength remains markedly lower at good early strength values.

The laboratory cement LZ2 (column III) consisted of 30% by weight of the standard cement indicated in the first column and 70% by weight of a pozzolanic slag obtained by partial reduction from waste incineration slags. The selected pozzolan was added in an overall quantity of 70% by weight, having an $SiO_2/CaO$ ratio of >1 and alkali oxides in amounts of more than 1.5% by weight. The values obtainable in this manner demonstrate that the early strength markedly decreases upon the addition of such pozzolanic slags.

In column IV, naphthalene sulfonate has been added to the laboratory cement LZ2 according to column III in an overall quantity of 1.5% by weight, whereby a marked improvement of the early strength and a considerable increase in the final strength could surprisingly be obtained.

Column IV of the Table below indicates the strength values of an iron-oxide-containing and hence only partially reduced synthetic pozzolan having the composition according to analysis A. When using a more strongly reduced and hence iron-oxide-free pozzolan according to analysis B, an early strength higher by approximately 10% was observed at a substantially equal final strength.

The clinker used for the production of mixed cement had the following composition: Blaine index: 5600 $cm^2/g$ (Blaine)

| | |
|---|---|
| Loss on ignition | 2.0% by weight |
| $SiO_2$ | 20.4% by weight |
| $Al_2O_3$ | 5.0% by weight |
| $Fe_2O_3$ | 2.6% by weight |
| CaO | 63.2% by weight |
| MgO | 2.1% by weight |
| $SO_3$ | 3.0% by weight |
| $K_2O$ | 1.1% by weight |
| $Na_2O$ | 0.13% by weight |
| $TiO_2$ | 0.29% by weight |
| $Cr_2O_3$ | 0.0096% by weight |
| $Mn_2O_3$ | 0.04% by weight |
| $P_2O_5$ | 0.09% by weight |
| Cl | 0.01% by weight |
| Total | 99.97% by weight |

Analysis A:
 Iron-oxide-containing puzzolan
 (Blaine index=5600 $cm^2/g$ as well as 12% retainings on 20 μm screen)

| | |
|---|---|
| $SiO_2$ | 43.6% by weight |
| $Al_2O_3$ | 13.7% by weight |
| $Fe_2O_3$ | 12.4% by weight |
| CaO | 19.1% by weight |
| MgO | 2.6% by weight |
| $SO_3$ | 0.17% by weight |
| $K_2O$ | 0.84% by weight |
| $Na_2O$ | 2.8% by weight |
| $TiO_2$ | 1.7% by weight |
| $Cr_2O_3$ | 0.76% by weight |
| $Mn_2O_3$ | 0.47% by weight |
| $P_2O_5$ | 0.33% by weight |
| Cl | 0.03% by weight |
| Cu, Zn | balance |
| Total | 100% by weight |

Analysis B:
 Strongly reduced puzzolan
 (Blaine index=5400 $cm^2/g$ as well as 16% retainings on 20 μm screen)

| | |
|---|---|
| $SiO_2$ | 51% by weight |
| $Al_2O_3$ | 16% by weight |
| CaO | 22% by weight |
| MgO | 3% by weight |
| $SO_3$ | 0.2% by weight |
| $K_2O$ | 1% by weight |
| $Na_2O$ | 3.5% by weight |
| $TiO_2$ | 2% by weight |
| Total | 98.70% by weight |

TABLE

Compressive strengths after 1, 2 and 28 days

| | I REF cement NORMO4 Siggenthal | II LZ 1 | III LZ2 | IV LZ2 + 1.5% naphatalene sulfonate |
|---|---|---|---|---|
| W/Z | 0.46 | 0.53 | 0.45 | 0.30 |
| 1 day [N/mm²] | 14.3 | 15.6 | 6.4 | 10.0 |
| 2 days [N/mm²] | 27.8 | 21.8 | 9.3 | 24.7 |
| 28 days [N/mm²] | 55.4 | 28.1 | 32.9 | 75.7 |

W/Z = water/binder ratio

What is claimed is:

1. A cement composition comprising:
 a) 10 to 35% by weight of portland cement;
 b) 65 to 90% by weight of a synthetic pozzolan obtained by an at least partial reduction from combustion residues having a $SiO_2/CaO$ ratio of greater than 1:1 and containing $Na_2O$ and $K_2O$ as alkali oxides in an amount exceeding 1.5% by weight; and c) an activator for reducing a positive surface potential of the synthetic pozzolan, said activator comprising anionically active or anionic tensides.

2. A cement composition according to claim 1, wherein the composition contains the activator in a concentration of from 1 to 3% by weight.

3. A cement composition according to claim 1 or 2, wherein the composition contains the pozzolan in a concentration of from 65 to 70% by weight.

4. A cement composition according to claim 1 or 2, wherein the activator comprises lignin or naphthalene sulfonates present in the composition in a concentration of from 1.0 to 2.0% by weight.

5. A cement composition according to claim 1 or 2, wherein the pozzolan is ground to a fineness of 3000 to 6000 $cm^2/g$.

6. A cement composition according to claim 1 or 2, wherein the anionically active or anionic tensides are added to the composition along with water.

7. A cement composition according to claim 1 or 2, wherein the $Na_2O$ and $K_2O$ content of the pozzolans is larger than 2% by weight.

8. A cement composition according to claim 3, wherein the activator comprises lignin or naphtholene sulfonates present in the composition in a concentration of from 1.0 to 2.0% by weight.

9. A cement composition according to claim 3, wherein the pozzolan is ground to a fineness of 3000 to 6000 $cm^2/g$.

10. A cement composition according to claim 4, wherein the pozzolan is ground to a fineness of 3000 to 6000 $cm^2/g$.

11. A cement composition according to claim 8, wherein the pozzolan is ground to a fineness of 3000 to 6000 $cm^2/g$.

12. A cement composition according to claim 3, wherein the anionically active or anionic tensides are added to the composition along with water.

13. A cement composition according to claim 4, wherein the anionically active or anionic tensides are added to the composition along with water.

14. A cement composition according to claim 5, wherein the anionically active or anionic tensides are added to the composition along with water.

15. A cement composition according to claim 8, wherein the anionically active or anionic tensides are added to the composition along with water.

16. A cement composition according to claim 9, wherein the anionically active or anionic tensides are added to the composition along with water.

17. A cement composition according to claim 10, wherein anionically active or anionic tensides are added to the composition along with water.

18. A cement composition according to claim 11, wherein the anionically active or anionic tensides are added to the composition along with water.

19. A cement composition according to claim 3, wherein the $Na_2O$ and $K_2O$ content of the pozzolans is larger than 2% by weight.

20. A cement composition according to claim 4, wherein the $Na_2O$ and $K_2O$ content of the pozzolans is larger than 2% by weight.

21. A cement composition according to claim 5, wherein the $Na_2O$ and $K_2O$ content of the pozzolans is larger than 2% by weight.

22. A cement composition according to claim 6, wherein the $Na_2O$ and $K_2O$ content of the pozzolans is larger than 2% by weight.

23. A cement composition according to claim 8, wherein the $Na_2O$ and $K_2O$ content of the pozzolans is larger than 2% by weight.

24. A cement composition according to claim 9, wherein the $Na_2O$ and $K_2O$ content of the pozzolans is larger than 2% by weight.

25. A cement composition according to claim 10, wherein the $Na_2O$ and $K_2O$ content of the pozzolans is larger than 2% by weight.

26. A cement composition according to claim 11, wherein the $Na_2O$ and $K_2O$ content of the pozzolans is larger than 2% by weight.

27. A cement composition according to claim 12, wherein the $Na_2O$ and $K_2O$ content of the pozzolans is larger than 2% by weight.

28. A cement composition according to claim 13, wherein the $Na_2O$ and $K_2O$ content of the pozzolans is larger than 2% by weight.

29. A cement composition according to claim 14, wherein the $Na_2O$ and $K_2O$ content of the pozzolans is larger than 2% by weight.

30. A cement composition according to claim 15, wherein the $Na_2O$ and $K_2O$ content of the pozzolans is larger than 2% by weight.

31. A cement composition according to claim 16, wherein the $Na_2O$ and $K_2O$ content of the pozzolans is larger than 2% by weight.

32. A cement composition according to claim 17, wherein the $Na_2O$ and $K_2O$ content of the pozzolans is larger than 2% by weight.

33. A cement composition according to claim 18, wherein the $Na_2O$ and $K_2O$ content of the pozzolans is larger than 2% by weight.

* * * * *